(12) United States Patent
Tamura et al.

(10) Patent No.: US 9,371,088 B2
(45) Date of Patent: Jun. 21, 2016

(54) VEHICLE STEERING DEVICE

(71) Applicant: HONDA MOTOR CO., LTD., Tokyo (JP)

(72) Inventors: Norifumi Tamura, Wako (JP); Yoshifumi Banno, Wako (JP); Shoji Hamada, Wako (JP); Yuki Endo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/331,466

(22) Filed: Jul. 15, 2014

(65) Prior Publication Data
US 2015/0025743 A1 Jan. 22, 2015

(30) Foreign Application Priority Data

Jul. 16, 2013 (JP) .................................. 2013-147273

(51) Int. Cl.

| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *B05D 1/00* | (2006.01) |
| *G06F 7/00* | (2006.01) |
| *G06F 17/00* | (2006.01) |
| *G06F 19/00* | (2011.01) |
| *B62D 5/04* | (2006.01) |
| *B62D 6/04* | (2006.01) |

(52) U.S. Cl.
CPC ........ *B62D 6/00* (2013.01); *B62D 5/046* (2013.01); *B62D 6/04* (2013.01)

(58) Field of Classification Search
CPC .................................... B62D 6/04; B62D 6/00
USPC .......................................................... 701/41
See application file for complete search history.

(56) References Cited

U.S. PATENT DOCUMENTS

2011/0022270 A1* 1/2011 Tamaizumi .............. B62D 6/04
701/41

FOREIGN PATENT DOCUMENTS

| CN | 101998918 A | | 3/2011 |
|---|---|---|---|
| JP | 2001-001923 A | | 1/2001 |
| JP | 2001001923 | * | 1/2001 |

OTHER PUBLICATIONS

Office Action dated Feb. 3, 2016, issued in counterpart Chinese Application No. 201410333482.2, with English translation (10 pages).

* cited by examiner

*Primary Examiner* — Maceeh Anwari
(74) *Attorney, Agent, or Firm* — Westerman, Hattori, Daniels & Adrian, LLP

(57) ABSTRACT

A vehicle steering device including a steering torque detection unit that detects a steering torque, the vehicle steering device controlling an electric current value, which is applied to an electric motor, and applying an assist torque to a steering system based on the steering torque, includes a one-side pull response control unit that detects one-side pull generated at a vehicle, and corrects the current value to restrict the one-side pull. One-side pull response control is restricted or inhibited for a predetermined time after the vehicle ends a turn.

15 Claims, 10 Drawing Sheets

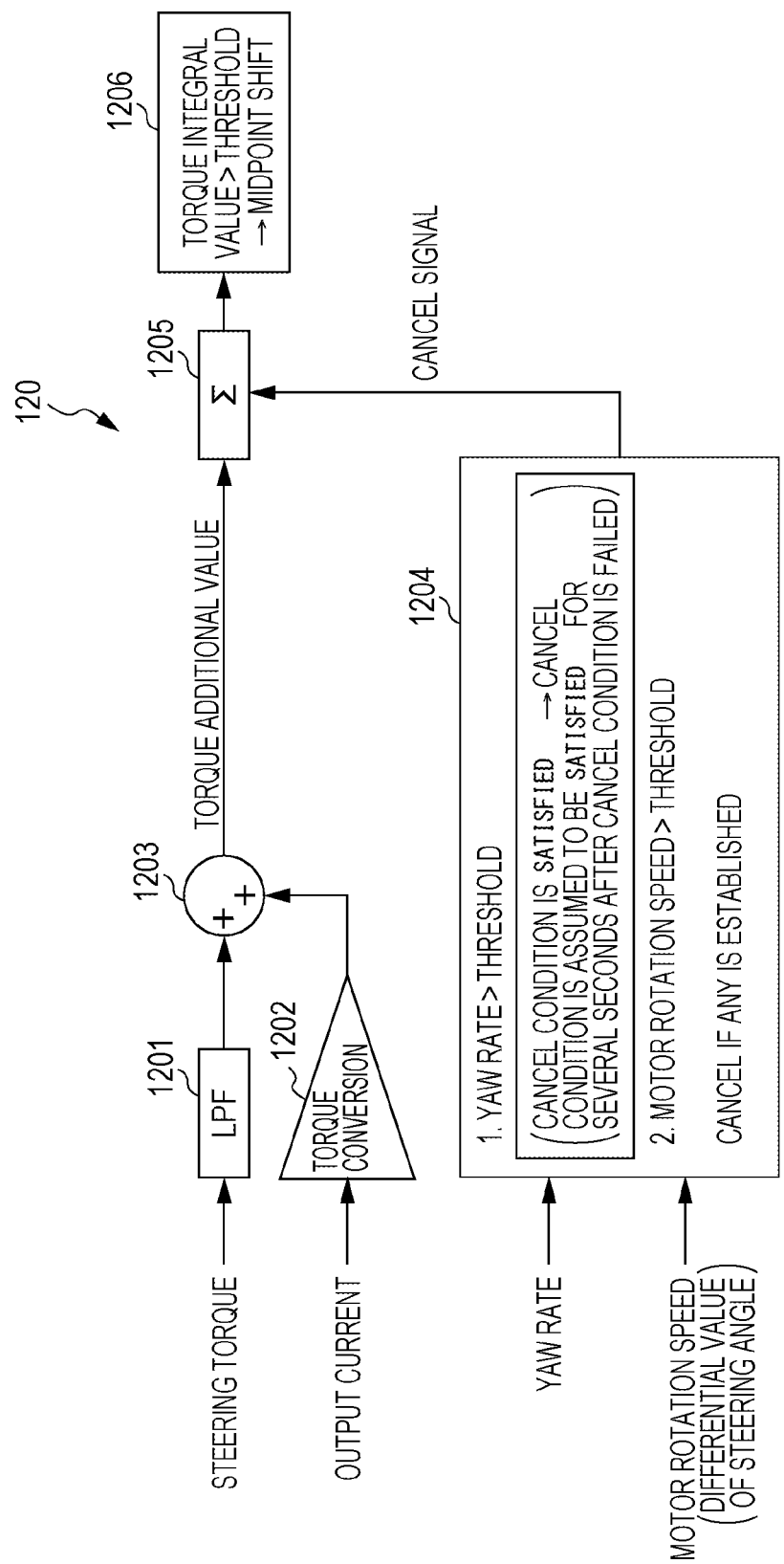

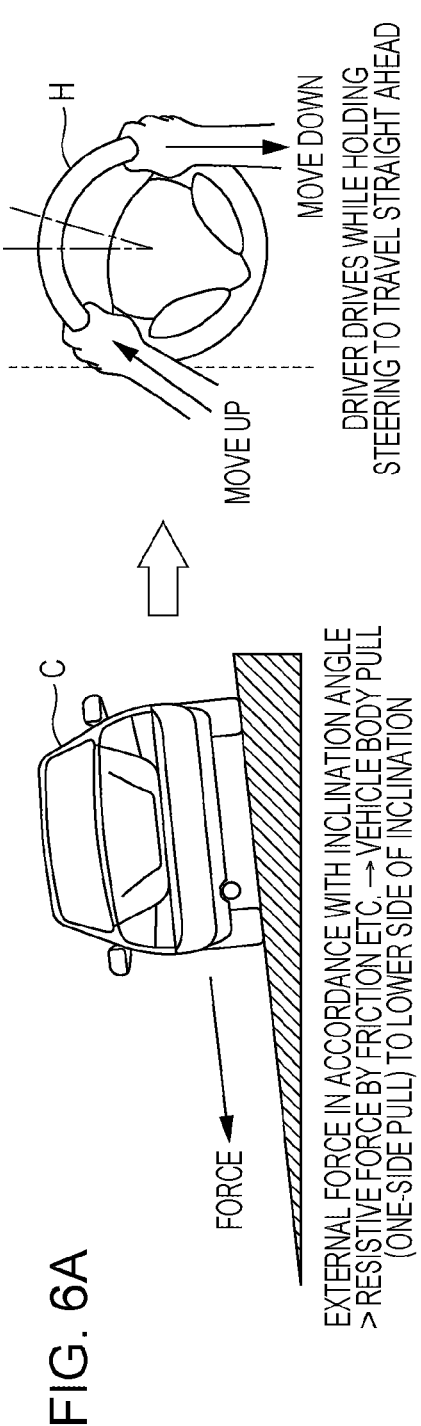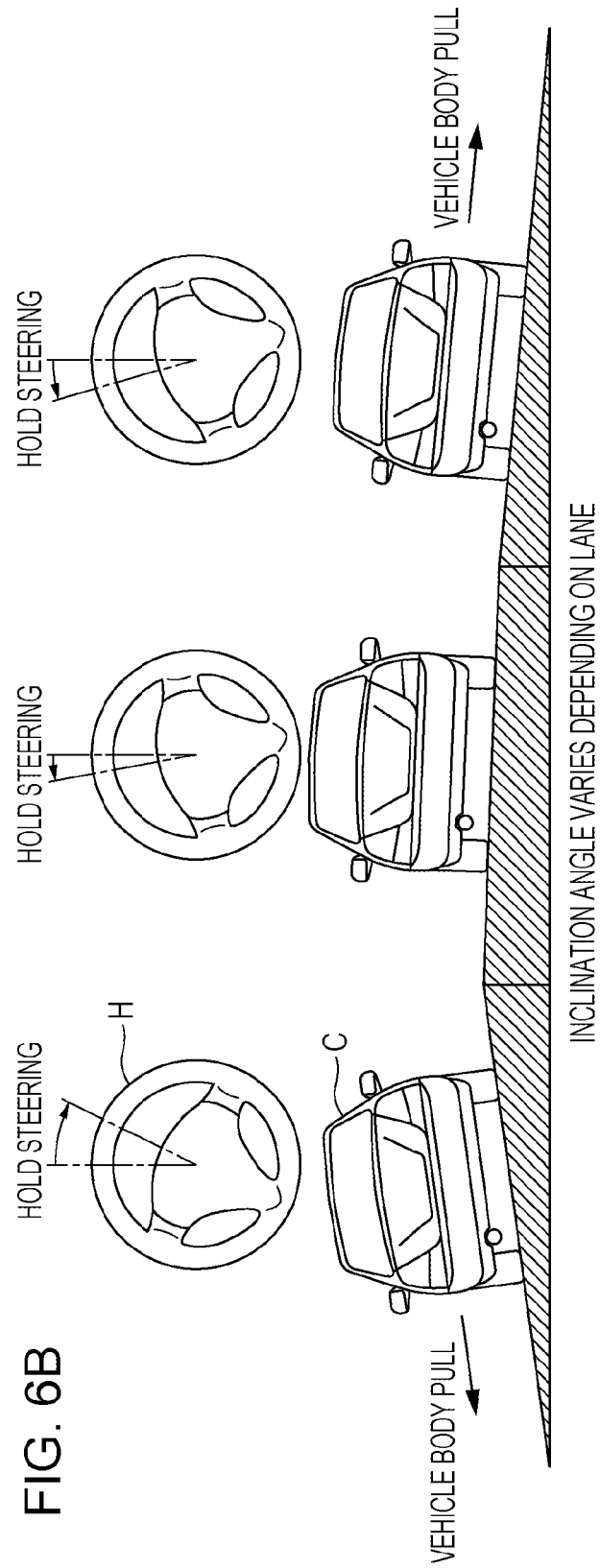

FIG. 7A
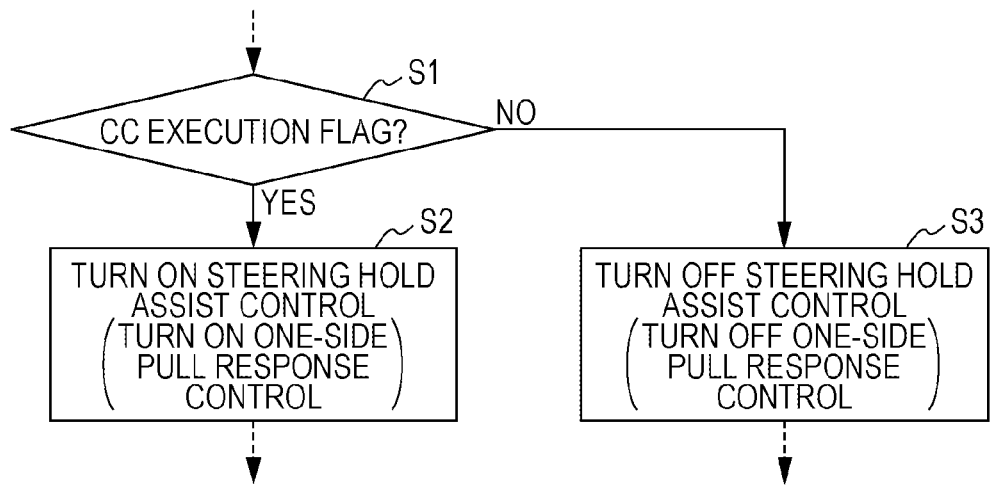
FIG. 7B
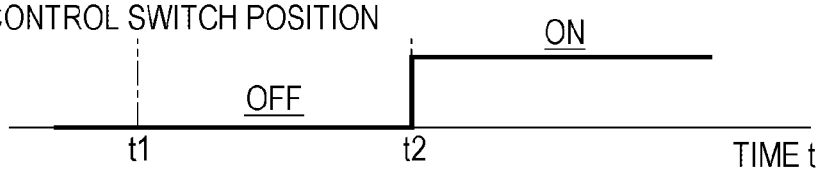
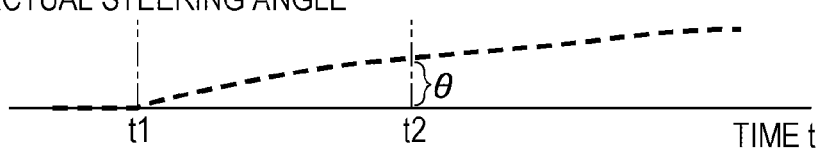
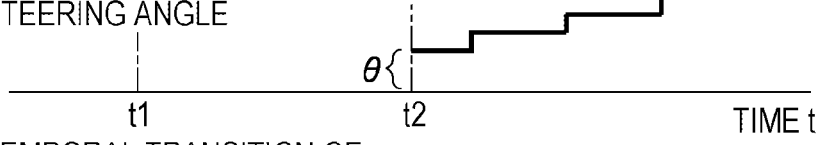
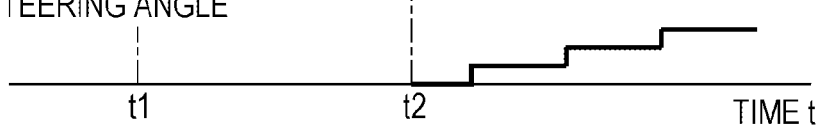

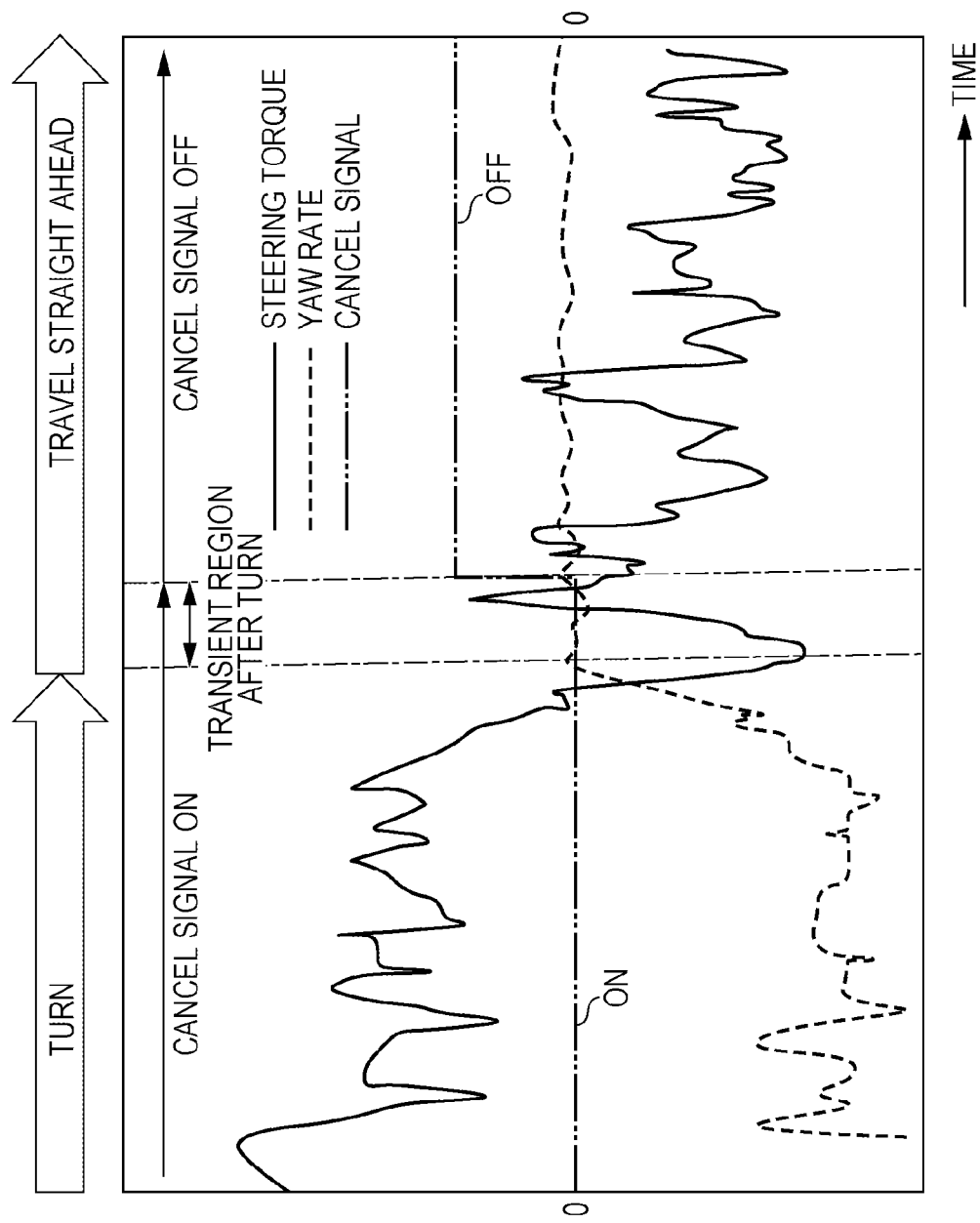

VEHICLE STEERING DEVICE

CROSS REFERENCES TO RELATED APPLICATIONS

The present application claims priority under 35 U.S.C. §119 to Japanese Patent Application No. 2013-147273, filed Jul. 16, 2013, entitled "Vehicle Steering Device." The contents of this application are incorporated herein by reference in their entirety.

TECHNICAL FIELD

The present disclosure relates to a vehicle steering device including an electric motor for steering (steering assist).

BACKGROUND

When a vehicle travels on a cant road with an inclination in the width direction of the road (toward a road shoulder) or when the vehicle travels in side winds, the vehicle pulls to the lower side in the inclination direction because of the gravity on the cant road, or the vehicle pulls to the leeward in the side winds because of the wind power although the vehicle intends to travel straight ahead. That is, one-side pull of the vehicle is generated. Hence, to travel straight ahead against the one-side pull of the vehicle, a driver has to rotate a steering wheel to the upper side in the inclination direction or the windward. That is, even during the straight-ahead travel, the driver has to continuously give a steering force in a direction opposite to a direction to which the vehicle pulls (the one-side pull direction).

For example, Japanese Unexamined Patent Application Publication No. 2001-1923 discloses a vehicle steering device that, in the case that a disturbance, which affects a vehicle behavior, is generated (for example, during travel on the cant road or during travel in the side winds), can obtain a disturbance effect value D meeting the degree of effect of the disturbance with respect to the vehicle behavior, and can control a steering assist force Ta in accordance with the disturbance effect value D. In Japanese Unexamined Patent Application Publication No. 2001-1923, a dead band is provided around the midpoint of a steering torque, and the steering assist force is generated if the steering torque exceeds the dead band, to cancel the disturbance (the inclination of the cant road or side winds).

However, in Unexamined Patent Application Publication No. 2001-1923, since the control is executed with the dead band provided for the steering torque as shown in FIG. 4 etc. thereof, the driver receives a load until the steering torque exceeds the dead band, and thus comfortableness may be decreased. Also, in the case of a driver who is unskilled in driving, the driver may excessively rotate the steering wheel for a turn. Owing to this, when the turn is ended, the vehicle may be steered by a certain degree in a direction opposite to the turn direction. At this time, the steering in the opposite direction is considered as the result of the effect by the cant road surface, and control may not be properly made for the one-side pull.

SUMMARY

Accordingly, it is desirable to provide a vehicle steering device that can properly restrict one-side pull in a situation in which the one-side pull of a vehicle is generated, for example, on a cant road.

According to one aspect of the present disclosure, there is provided a vehicle steering device (1) including a steering torque detection unit that detects a steering torque, the vehicle steering device controlling an electric current value, which is applied to an electric motor, and applying an assist torque to a steering system based on the steering torque. The device includes a one-side pull response control unit that detects one-side pull generated at a vehicle, and corrects the current value to restrict the one-side pull. One-side pull response control is restricted or inhibited for a predetermined time after the vehicle ends a turn.

At start of straight travel recovered from the turn, even if the judgment of the straight-ahead travel is made, the behavior may become unstable. Hence, the one-side pull control is restricted or inhibited for the predetermined time after the turn is ended. Accordingly, the proper one-side pull response control is provided.

Also, according to another aspect of the present disclosure, there is provided a vehicle steering device (2) including a steering torque detection unit that detects a steering torque, the vehicle steering device controlling an electric current value, which is applied to an electric motor, and applying an assist torque to a steering system based on the steering torque. The device includes a steering angle detection unit that detects a steering angle; a vehicle behavior detection unit that detects a vehicle behavior; and a one-side pull response control unit that judges straight-ahead travel of a vehicle in accordance with the vehicle behavior and the steering angle, calculates an integral value of the steering torque while the judgment of the straight-ahead travel is made, and calculates a correction current value, which corrects the current value to restrict one-side pull generated at the vehicle based on the integral value and the steering angle. The correction current value is not newly calculated for a predetermined time after a turn is ended and the vehicle is started to be judged as the straight-ahead travel.

At start of straight travel recovered from the turn, even if the judgment of the straight-ahead travel is made, the behavior may become unstable. Hence, the correction current value is not calculated for the predetermined time after the turn is ended. In an embodiment, which will be described later, the correction current value is not calculated by canceling integration of a toque for a predetermined time even after the turn is ended.

Further, according to sill another aspect of the present disclosure, there is provided a vehicle steering device (3) including a steering torque detection unit that detects a steering torque, the vehicle steering device controlling an electric current value, which is applied to an electric motor, and applying an assist torque to a steering system based on the steering torque. The device includes a steering angle detection unit that detects a steering angle; a vehicle behavior detection unit that detects a vehicle behavior; and a one-side pull response control unit that judges straight-ahead travel of a vehicle in accordance with the vehicle behavior and the steering angle, calculates an integral value of the steering torque while the judgment of the straight-ahead travel is made, and calculates a correction current value, which corrects the current value to restrict one-side pull generated at the vehicle based on the integral value and the steering angle. A control amount of the one-side pull response control unit is decreased for a predetermined time after a turn is ended and the vehicle is started to be judged as the straight-ahead travel.

At start of straight travel recovered from the turn, even if the judgment of the straight-ahead travel is made, the behavior may become unstable. Hence, the control amount of the one-side pull response control unit is decreased for the predetermined time after the turn is ended. For example, a map, in which a target current value (one-side pull response), serving as the control amount, is decreased for a predetermined time after the turn is ended, is used.

With the present disclosure, the vehicle steering device that can properly restrict the one-side pull in the situation in which the one-side pull of the vehicle is generated, for example, on the cant road is provided.

BRIEF DESCRIPTION OF THE DRAWINGS

The advantages of the disclosure will become apparent in the following description taken in conjunction with the following drawings.

FIG. 4 is a block diagram showing an internal configuration of a midpoint shift controller in FIG. 3.

FIG. 5A shows a case of a flat road. FIG. 5B shows a case without one-side pull response control on a cant road (a case before the one-side pull response control is started). FIG. 5C shows a case with the one-side pull response control on a cant road (a case after the one-side pull response control is started).

FIG. 6A illustrates an external force which is applied to a vehicle on a cant road, and steering of the driver. FIG. 6B illustrates that the inclination of a cant road varies depending on the lane.

FIG. 7A is a brief flowchart showing association between cruise control and one-side pull response control according to this embodiment. FIG. 7B schematically shows time charts of the one-side pull response control. In FIG. 7B, part (a) shows a temporal transition of a cruise control switch position, part (b) shows a temporal transition of an actual steering angle, part (c) shows a temporal transition of a one-side pull response steering angle when a steering angle of θ at a time t2 serves as an initial value, and part (d) shows a temporal transition of the one-side pull response steering angle when a steering angle of zero at the time t2 serves as an initial value.

FIG. 8 shows changes in steering torque (thin solid line), yaw rate (thick broken line), and cancel signal (thick two-dot chain line) when the travel state is shifted from a turn (left side in the drawing) to straight-ahead travel (right side in the drawing).

DETAILED DESCRIPTION

Embodiments (implemental embodiments) for implementing the present disclosure are described below in detail with reference to the accompanying drawings.

First Embodiment

General Configuration

Figure 1:
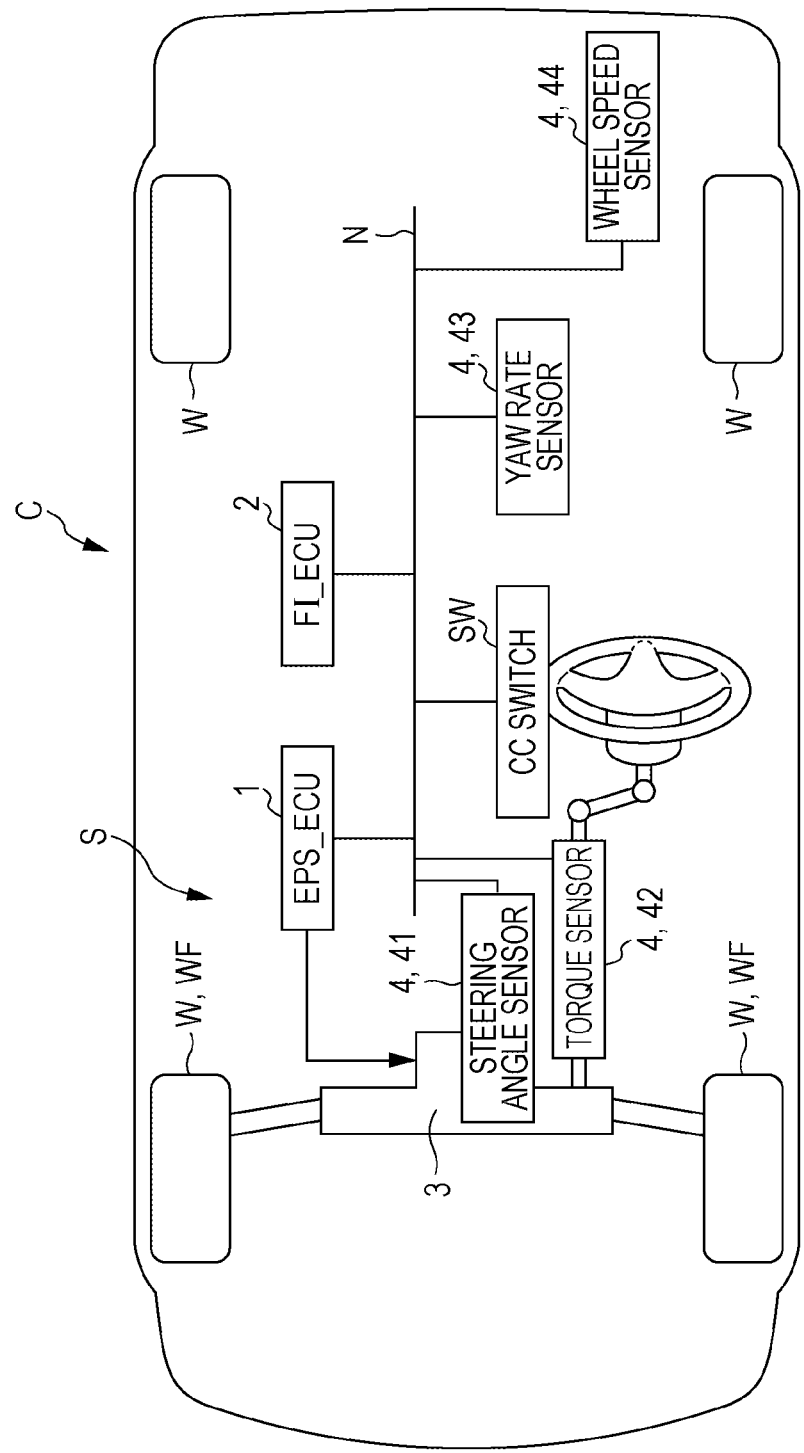
FIG. 1 schematically illustrates a general configuration of a vehicle on which a vehicle steering device according to a first embodiment of the disclosure is mounted.

FIG. 1 schematically illustrates a general configuration of a vehicle C on which a vehicle steering device S according to an embodiment of the present disclosure is mounted. As shown in FIG. 1, the vehicle C is a four-wheel vehicle including four wheels W (reference sign WF denotes a wheel for steering). The vehicle C includes a configuration of an electric power steering device having an EPS_ECU 1 and a steering motor 3 as principal portions of the vehicle steering device S. The electric power steering device is a known device that may decrease a required steering force of a driver to be input from a steering wheel H, by actuating the motor 3. Hence, the detailed description of the electric power steering device is omitted. Also, the vehicle C includes an FI_ECU 2. The FI_ECU 2 is also a known technology, and hence the detailed description thereof is omitted.

EPS is an abbreviation for electric power steering. Also, FI is an abbreviation for fuel injection. ECU is an abbreviation for electronic control unit.

In FIG. 1, reference sign 41 denotes a steering angle sensor (steering angle detection unit), and in this embodiment, an angle sensor that measures an angle of the motor 3 is used as a substitute for the steering angle sensor. The steering angle sensor 41 also detects a rotation speed (motor rotation speed (=steering speed)) of the motor 3 in addition to the steering angle. Reference sign 42 denotes a steering torque sensor (steering torque detection unit, in FIG. 1, written as "torque sensor") that detects a steering torque (manual steering force) input from the driver through the steering wheel H. Reference sign 43 denotes a yaw rate sensor (vehicle behavior detection unit) that detects a yaw rate (turn angle) of the vehicle C. Reference sign 44 denotes a wheel speed sensor that detects a rotation speed (wheel speed pulse) of the wheel W. FIG. 1 illustrates the wheel speed sensor only for the single wheel W; however, the wheel speed sensor is actually provided for each of the four wheels W. The vehicle speed may be an average value of detection values of the wheel speed sensors 44 provided at the four wheels W, or an average value of detection values of the wheel speed sensors 44 provided at the wheels W serving as driven wheels.

The respective sensors including the steering angle sensor 41 to the wheel speed sensors 44 may be collectively called sensor(s) 4.

In FIG. 1, reference sign SW denotes a cruise control switch (in FIG. 1, written as "CC switch"). The cruise control switch SW is arranged at the steering wheel H or near the steering wheel H, and is turned ON by the driver when the vehicle travels on a highway or the like under cruise control. In the following description, it is assumed that the cruise control switch SW is arranged at the steering wheel H.

The cruise control switch SW is automatically deactivated (turned OFF) under a predetermined condition, such as when a brake pedal is depressed, in addition to a situation in which the driver turns OFF the cruise control switch SW.

In FIG. 1, the EPS_ECU 1, the FI_ECU 2, the respective sensors 4, the cruise control switch SW, etc., are connected with each other through a communication line N such as a control area network (CAN).

Figure 2:
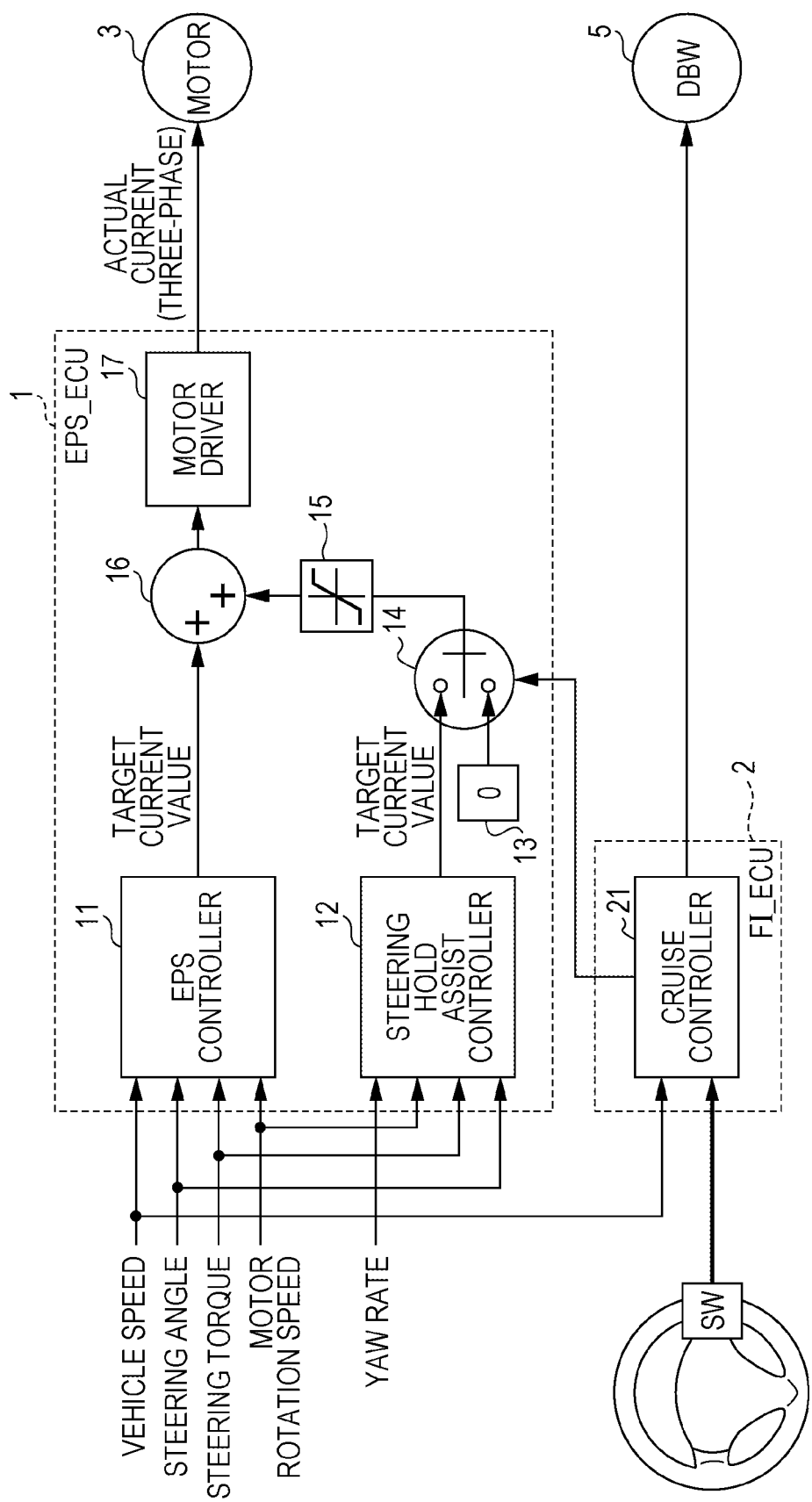
FIG. 2 is a block diagram showing brief configurations of an EPS_ECU and an FI_ECU in the vehicle in FIG. 1, and association between the EPS_ECU and the FI_ECU.

FIG. 2 is a block diagram showing brief configurations of the EPS_ECU 1 and the FI_ECU 2 in the vehicle in FIG. 1, and association between the EPS_ECU 1 and the FI_ECU 2.

[EPS_ECU]

As shown in FIG. 2, the EPS_ECU 1 is a driving control unit that includes an EPS controller 11, a steering hold assist controller (one-side pull response control unit) 12, a zero current value output unit 13, a switch 14, a limiter 15, an adder 16, and a motor driver 17, and that controls drive of the motor 3 for EPS. In the EPS_ECU 1, the steering hold assist controller 12, the zero current value output unit 13, the switch 14, the limiter 15, and the adder 16 are characteristic parts of this embodiment. The EPS controller 11 and the motor driver 17 are known configurations, and hence the specific description for the known configurations is omitted. The EPS controller 11, the steering hold assist controller 12, the zero current value output unit 13, the switch 14, the limiter 15, the adder 16, and the motor driver 17 may be respectively implemented by a circuit, or by a computer or processor which executes a program.

Although the detail is described later with reference to FIG. 3, the steering hold assist controller 12 is a function part having a function of outputting a target current value (one-side pull response) for canceling one-side pull, for example, in a situation, in which the one-side pull is generated on a cant road, to the downstream switch 14. The steering hold assist controller 12 provides "one-side pull response control."

The target current value (one-side pull response) corresponds to "correction current value."

The zero current value output unit 13 is a function part having a function of outputting a current value (0), which is supplied to the adder 16, to the downstream switch 14.

The switch 14 is a function part having a function of outputting the target current value (one-side pull response) from the steering hold assist controller 12 to the downstream limiter 15 when the cruise control switch SW is ON, or outputting the zero current value from the zero current value output unit 13 to the downstream limiter 15 when the cruise control switch SW is OFF, in accordance with a signal (cruise control execution flag (CC execution flag)) from a cruise controller 21.

The limiter 15 is a function part having a configuration that provides limitation if the absolute value of the current value output from the switch 14 exceeds, for example, a predetermined limit value. For example, when the cruise control switch SW is ON, if the absolute value of the target current value (one-side pull response) output from the steering hold assist controller 12 exceeds the predetermined limit value, the limiter 15 prevents the absolute value from exceeding the limit value.

The adder 16 adds the current value (one-side pull response) output from the limiter 15 to the target current value output from the EPS controller 11. The adder 16 is a function part having a function of adding the target current value (one-side pull response) output from the steering hold assist controller 12 to the target current value output from the EPS controller 11, and outputting the added value to the motor driver 17, when the cruise control switch SW is ON.

The motor driver 17 includes an arithmetic unit, an inverter, etc. The motor driver 17 is a function part having a function of generating a pulse width modulation (PWM) signal in accordance with the target current value after the addition processing output from the adder 16, driving the inverter with the PWM signal and generating three-phase alternating current, and driving the motor 3 with the PWM.

[FI_ECU]

The FI_ECU 2 shown in FIG. 2 is also called engine ECU that controls, for example, an ignition timing and a fuel injection amount. The FI_ECU 2 of the vehicle C in this embodiment includes the cruise controller 21. The cruise controller 21 outputs the signal (CC execution flag) to the switch 14 when the cruise control switch SW arranged at the steering wheel H is ON, so as to cause the target current value (one-side pull response) output from the steering hold assist controller 12 to be output to the downstream limiter 15.

Also, when the cruise control switch SW is turned ON, the cruise controller 21 controls the output of an engine (driving motor) through a drive by wire (DBW) valve 5, and hence causes the vehicle C to travel at a constant vehicle speed. With use of this function, for example, the driver can drive the vehicle C on a long straight road without a traffic signal or the like, at a constant vehicle speed without control of an accelerator with a foot (even when the driver releases the foot from an accelerator pedal).

Regarding association between the cruise controller 21 and the switch 14, if the cruise control switch SW is ON, one-side pull response control (steering hold assist control) is more likely executed. Based on this assumption, the switch 14 is switched to the steering hold assist controller 12 to enable the one-side pull response control (steering hold assist control). Also, if the cruise control switch SW is ON, large steering is not performed, and the one-side pull response control less likely disturb comfortableness of the driver. Based on this assumption, the switch 14 is switched to the steering hold assist controller 12 to enable the one-side pull response control.

[Steering Hold Assist Controller]

Figure 3:
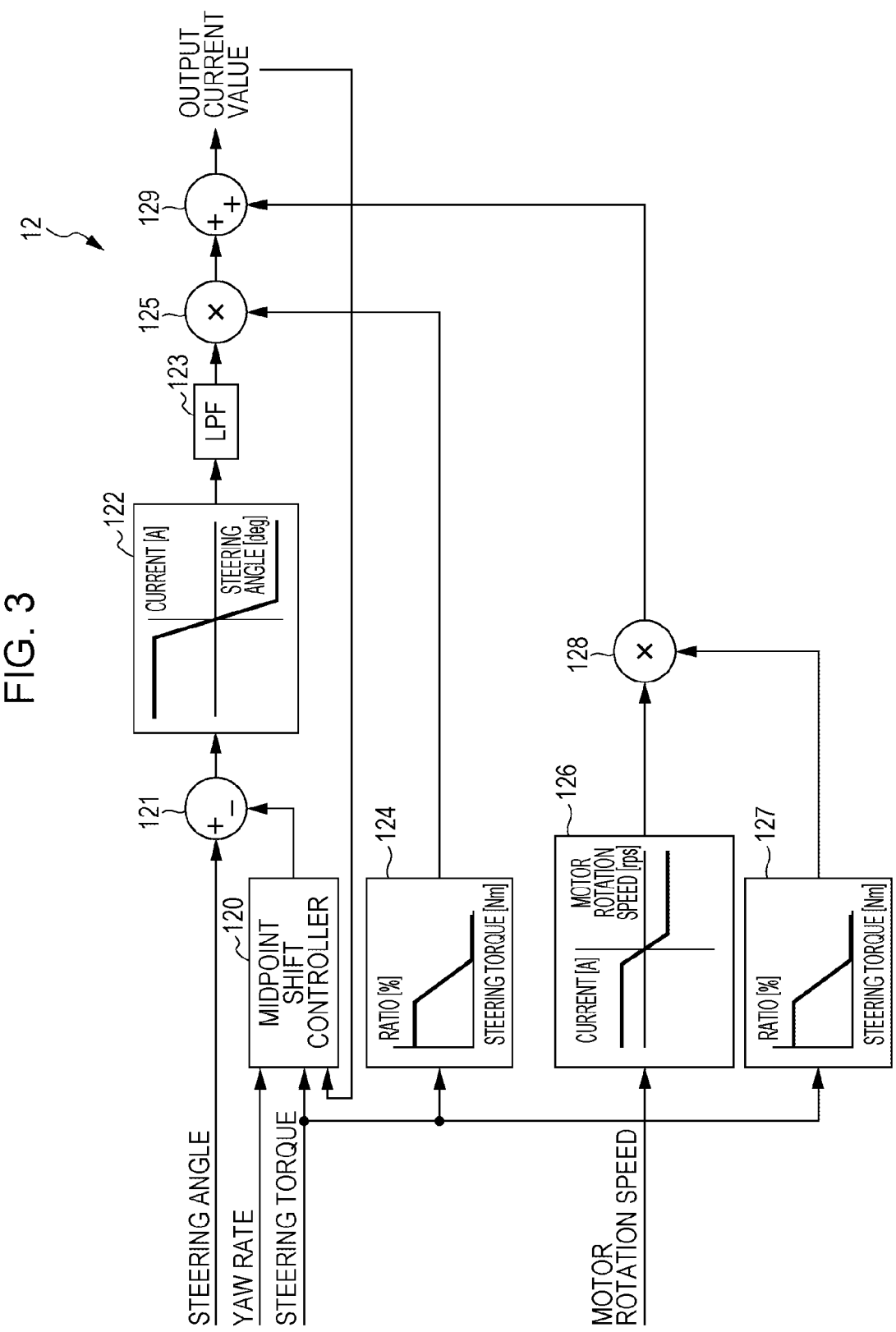
FIG. 3 is a block diagram showing an internal configuration of a steering hold assist controller in FIG. 2.

Next, the detail of the steering hold assist controller 12 is described mainly with reference to FIG. 3, which is a block diagram showing an internal structure thereof.

As shown in FIG. 3, the steering hold assist controller 12 includes a midpoint shift controller 120, a subtracter 121, a steering hold assist current value setting unit 122, a low-pass filter (LPF) 123, a first ratio output unit 124, a multiplier 125, a damper current value setting unit 126, a second ratio output unit 127, a multiplier 128, an adder 129, and other unit.

The steering hold assist controller 12 in this embodiment is a function part having a function of outputting a target current value (one-side pull response) that restricts the motion of the motor 3 against the force of generating the one-side pull on the vehicle C, for example, on a cant road or in side winds.

The midpoint shift controller 120 receives inputs of the yaw rate, the steering torque, and the output current value (current value output from the steering hold assist controller 12). For example, if an integral value of the steering torque (torque integral value) exceeds a threshold (midpoint shift judgment threshold), the midpoint shift controller 120 outputs a predetermined one-side pull response steering angle value with regard to the one-side pull. The midpoint shift controller 120 is described later in detail with reference to FIG. 4.

The initial value of the one-side pull response steering angle value is set at 0 deg, or a current steering-wheel steering angle. The initial value may be the current steering-wheel steering angle if the steering angle is smaller than a predetermined steering angle value, and the initial value may be 0 deg if the steering angle is the predetermined steering angle value or larger, or the yaw rate is a predetermined yaw rate or larger.

The subtracter 121 is a function part having a function of subtracting the one-side pull response steering angle value output from the midpoint shift controller 120 with reference to the initial value of 0 deg or the current steering angle input from the steering angle sensor 41.

The steering hold assist current value setting unit 122 is a function part having a function of receiving an input of the value output from the subtracter 121, and converting the input one-side pull response steering angle value into an electric current value (base current value) based on information of correspondence between the one-side pull response steering angle value and the current value. The information of the correspondence herein is set so that the absolute value of the base current value is increased as the absolute value of the steering angle is increased. This is because the driver holds the steering at a larger steering angle as the tendency of one-side pull is increased.

To be more specific, the information of the correspondence is set so that current, which restricts the motion of the motor 3, is supplied to the motor 3 against the force, which causes the vehicle C to pull to one side, for example, on a cant road. If the motion of the motor 3 is restricted, the motion of the steering wheel H is restricted. Consequently, the load of the driver for holding the steering with the steering wheel H is decreased.

The graph in the frame of the current value setting unit 122 in FIG. 3 shows the steering angle which is plus (+) from the center to the right of the graph and minus (−) from the center to the left. For example, in the case of a steering angle to the right, the current value is set at a value of minus (−).

Regarding the correspondence in the steering hold assist current value setting unit 122, the current is increased or decreased across the border of the initial value of the one-side pull response steering angle value. This is because center feel is provided by increasing or decreasing the current with respect to the initial value of the one-side pull response steering angle value. The initial value is, for example, 0 deg. The magnitude of the initial value is properly set based on the result of an experiment or a simulation.

Although the description is omitted, the EPS controller 11 also has a base current value and a damper current value. However, the base current value and a damper current value (described later) in the steering hold assist controller 12 are for the one-side pull response control (steering hold assist), and are basically different from those in the EPS controller 11.

The low-pass filter 123 is a function part having a function of leveling the base current value, for example, by obtaining a shift average of base current values output from the steering hold assist current value setting unit 122. Alternatively, by tuning the steering hold assist current value setting unit 122, the low-pass filter 123 may be omitted.

The first ratio output unit 124 is a function part having a function of receiving an input of the steering torque output from the steering torque sensor 42, and converting the input steering torque into a first ratio based on information of correspondence between the steering torque and the first ratio. The information of the correspondence herein is substantially set so that the value of the first ratio is decreased as the value of the steering torque is increased, for example, to allow the vehicle to easily change the lane.

The multiplier 125 is a function part having a function of multiplying the base current value output from the low-pass filter 123 by the first ratio output from the first ratio output unit 124 and hence correcting the base current value.

The damper current value setting unit 126 is a function part having a function of receiving an input of the motor rotation speed, that is, in this embodiment, a time differential value of the steering angle, and converting the input motor rotation speed into a current value (damper current value) based on information of correspondence between the motor rotation speed and the current. The information of the correspondence herein sets the damper current value so that, if the motor rotation speed is increased, the current is supplied to the motor 3 to restrict the motion.

The damper current value setting unit 126 is different from a known configuration for damper control in the EPS controller 11. The damper control in the EPS controller 11 is to give the driver stable steering feel by preventing the steering wheel H from being flattered while the vehicle C travels at a high speed. However, the damper current value in this damper current value setting unit 126 is to resist the one-side pull.

The second ratio output unit 127 is a function part having a function of receiving an input of the steering torque output from the steering torque sensor 42, and converting the input steering torque into a second ratio based on information of correspondence between the steering torque and the second ratio. The information of the correspondence herein is substantially set so that the value of the second ratio is decreased as the value of the steering torque is increased, similarly to the first ratio, for example, to allow the vehicle to easily change the lane, similarly to the first ratio.

The multiplier 128 is a function part having a function of multiplying the damper current value output from the damper current value setting unit 126 by the second ratio output from the second ratio output unit 127 and hence correcting the damper current value. The correction herein with the second ratio is, for example, to allow the vehicle to easily change the lane as described above.

The adder 129 adds the current value (base current value) output from the multiplier 125 and the current value (damper current value) output from the multiplier 128 together, and outputs the added value as a target current value (one-side pull response). In this embodiment, as shown in FIG. 2, the target current value (one-side pull response) is added to the target current value (target current value in EPS control) output from the EPS controller 11 at the adder 16 if the cruise control is ON. Then, the motor 3 is driven based on current, which is supplied from a battery (not shown) in accordance with the target current value after the addition.

[Midpoint Shift Controller]

Next, the midpoint shift controller 120 is described mainly with reference to FIG. 4, which is a block diagram showing an internal structure of the midpoint shift controller 120.

As shown in FIG. 4, the midpoint shift controller 120 includes a low-pass filter (LPF) 1201, a torque converter 1202, an additional torque calculator 1203, a midpoint shift cancel judging unit 1204, an integrator 1205, a steering angle midpoint shift amount setting unit 1206, and other unit.

The additional torque calculator 1203 quickly increases the torque integral value, and quickly shifts the midpoint.

The low-pass filter 1201 is a function part having a function of cutting a high frequency component of the steering torque output from the steering torque sensor 42, and outputting a low frequency component to the downstream additional torque calculator 1203. The low-pass filter 1201 cuts a high frequency component caused by protrusions and depressions of a road surface, and outputs only a steering torque of a low frequency component when the steering is held on a cant road, to the downstream additional torque calculator 1203.

The torque converter 1202 is a function part having a function of receiving an input of the output current of the motor 3 (current value output from the steering hold assist controller 12), multiplying the output current value by a predetermined conversion coefficient and hence converting the output current value into a steering torque, and outputting the steering torque to the downstream additional torque calculator 1203.

The additional torque calculator 1203 is a function part having a function of adding the value output from the torque converter 1202 (the value converted from the current value output from the steering hold assist controller 12 into the torque) to the steering torque output from the low-pass filter 1201 and hence calculating an additional torque, and outputting the additional torque to the downstream integrator 1205.

Since the value, which is obtained by converting the current value output from the steering hold assist controller 12 into the torque, is added to the steering torque, a midpoint shift condition is likely met, and response can be quickly made for the one-side pull.

When the midpoint is shifted and the one-side pull response control is started, the steering torque for the one-side pull is decreased by actuation of the motor 3. Hence, the additional torque converges to zero.

The midpoint shift cancel judging unit 1204 is a function part having a function of generating a cancel signal and outputting the cancel signal to the downstream integrator 1205, based on an assumption that a cancel condition is met in (1) a case in which the yaw rate input from the yaw rate sensor 43 exceeds a predetermined threshold, or (2) a case in which the motor rotation speed based on the steering angle sensor 41 exceeds a predetermined threshold. That is, the cancel signal is generated in accordance with a vehicle behavior.

At initial state from a turn to straight-ahead travel (in a transient region after the turn), the midpoint shift cancel judging unit 1204 continuously outputs the cancel signal to the integrator 1205 similarly to the state during the turn, for several seconds, even if the yaw rate becomes the predetermined threshold or smaller, so as not to shift the midpoint. That is, in the state in which the midpoint shift cancel judging unit 1204 outputs the cancel signal because the cancel condition is met, even if the cancel condition is failed, the output of the cancel signal is not immediately stopped, and the cancel signal is continuously output for several seconds (cancel condition is met→cancel condition is assumed to be met for several seconds after cancel condition is failed).

This is because, in the transient region after the turn, the steering torque which is detected by the steering torque sensor 42 may become disordered, and the integral value (torque integral value) of the additional torque at the integrator 1205 may be less appropriate. For example, it is not appropriate that the one-side pull response control is started before the driver sets the steering angle corresponding to the inclination of the cant road.

To be more specific, in the case of a driver who is unskilled in driving, the driver may excessively rotate the steering wheel H for a turn. Owing to this, when the turn is ended, the vehicle may be steered by a certain degree in a direction opposite to the turn direction. At this time, the steering in the opposite direction is considered as the result of the effect by the cant road surface (the additional torque is integrated), and control may not be properly made for the one-side pull.

In the midpoint shift cancel judging unit 1204, comparing the yaw rate with the predetermined threshold and comparing the motor rotation speed with the predetermined threshold are in other words judging the straight-ahead travel (vehicle behavior) (judging corruption of the straight-ahead travel). The midpoint shift cancel judging unit 1204 corresponds to "straight-ahead travel judging unit."

The integrator 1205 is a function part having a function of integrating the additional torque output from the additional torque calculator 1203 to obtain a torque integral value, and outputting the torque integral value to the downstream steering angle midpoint shift amount setting unit 1206. Also, the integrator 1205 has a function of setting the torque integral value at zero (function of clearance to zero) if the integrator 1205 receives an input of the cancel signal output from the midpoint shift cancel judging unit 1204.

For example, if the shift of the midpoint is canceled due to a turn or the like, the shift of the midpoint is stopped (canceled) while the one-side pull response steering angle value before the turn is held. The current value corresponding to the one-side pull response steering angle value is continuously output to the motor even during the turn.

For example, even if the turn is started when the one-side pull response steering angle value is 3 deg, the turn is executed while the value of 3 deg is held. The one-side pull response steering value is not shifted during the turn. In the case in which the turn is ended, the midpoint is not shifted until the turn is ended and a predetermined time further elapses.

The one-side pull response steering angle value is reset at IG-ON/OFF, or at switch ON/OFF if the value is associated with the cruise control.

The steering angle midpoint shift amount setting unit 1206 is a function part having a function of receiving an input of the torque integral value output from the integrator 1205, comparing the torque integral value with a predetermined threshold (midpoint shift judgment threshold), if the torque integral value exceeds the midpoint shift judgment threshold, the midpoint of the steering angle is shifted, and outputting the result to the subtracter 121 (see FIG. 3) as an output of the midpoint shift controller 120.

In this embodiment, if the torque integral value exceeds the midpoint shift judging threshold, the predetermined one-side pull response steering angle value is set. Alternatively, a one-side pull response steering angle value corresponding to the magnitude of the torque integral value may be set by calculation, for example, by multiplying the torque integral value by a predetermined coefficient.

[Operation 1]

Hereinbefore, the description is given from the general configuration of the vehicle C to the specific configurations of the respective units. Next, specific operations are described.

Figure 5A:
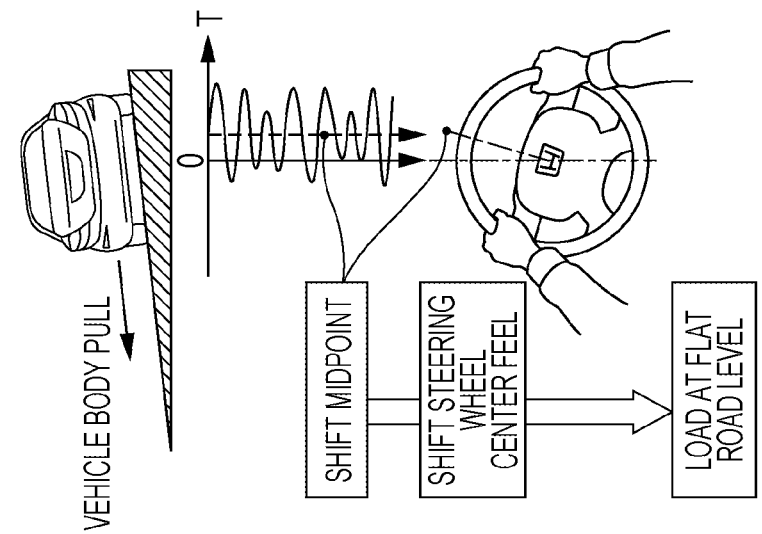
FIGS. 5A to 5C each illustrate an inclination of a vehicle body, a steering torque, a steering wheel operation load of a driver, etc., when the driver drives the vehicle and travels on a road.
Figure 5B:
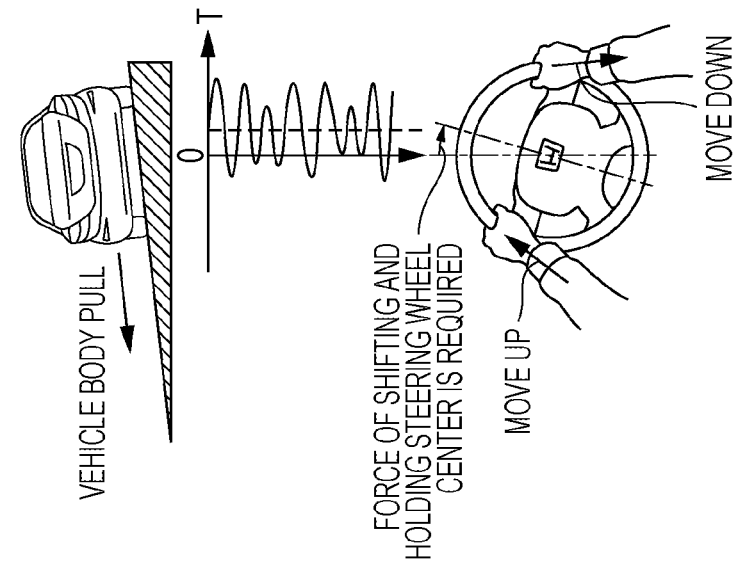
Figure 5C:
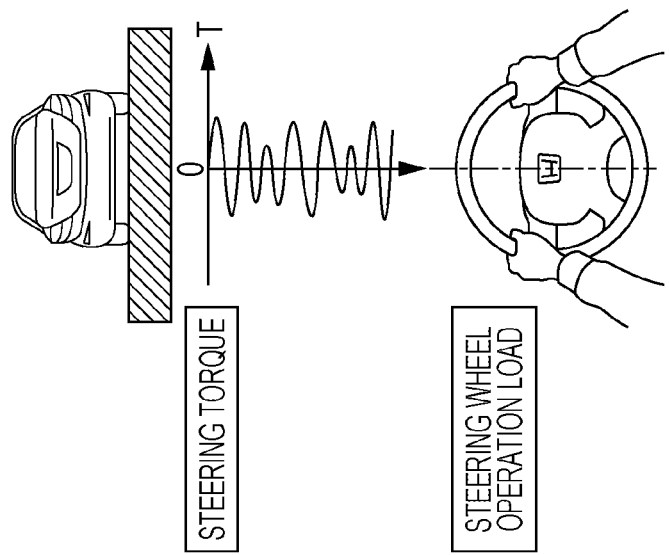

FIGS. 5A to 5C each illustrate an inclination of a vehicle body, a steering torque, etc., when the driver drives the vehicle C and travels on a road. FIG. 5A shows a case of a flat road. FIG. 5B shows a case without one-side pull response control on a cant road (a case before the one-side pull response control is started). FIG. 5C shows a case with the one-side pull response control on a cant road (a case after the one-side pull response control is started).

FIG. 6A illustrates an external force which is applied to the vehicle C on a cant road, and the steering of the driver. FIG. 6B illustrates that the inclination of a cant road varies depending on the lane.

[Flat Road]

As shown in FIG. 5A, in the case of the straight-ahead travel (straight line) on a flat road, the vehicle body of the vehicle C is in a horizontal posture, the steering wheel H is arranged at substantially the center, and the steering torque is oscillated around zero (slight steering).

The flat road herein represents a road without a noticeable inclination toward a road shoulder (that is, a road not being a cant road). The flat road may have vertical undulations (differences in height) present in the travel direction of the road.

[Cant Road (without One-Side Pull Response Control)]

As shown in FIG. 5B, on a cant road with an inclination toward a road shoulder, vehicle body pull (one-side pull of the vehicle C) is generated because of the gravity. As shown in FIG. 5B, on a cant road with an inclination to the lower side toward a left road shoulder, one-side pull (vehicle body pull) to the left is generated. Hence, the driver inclines the steering wheel H to the right and holds the steering.

If an electric power steering (EPS) device such as the vehicle steering device S in this embodiment is provided, the EPS (EPS controller 11) sets a target current value corresponding to a steering torque etc. in accordance with the steering torque, and causes the motor 3 to generate a steering assist force for assisting the steering force of the driver. However, since the EPS is designed assuming steering at an intersection, a curve road, a parking space, etc., the EPS may not correspond to one-side pull response on a cant road, that is, a case in which a not-so-large steering torque in one direction is continued for a long time. That is, in the case of a not-so-large steering torque, the steering assist force is almost not generated by the motor because of the dead band of the steering torque. For example, in the United States, there is a place in which a cant road continuously extends to improve drainage of the road. In such a place, the driver with the normal EPS is burdened with large load, and comfortableness may be decreased.

As shown in FIG. 6A, on a cant road with an inclination to the lower left side, if "external force corresponding to inclination angle">"resistive force caused by friction etc." is established, vehicle body pull (one-side pull) to the lower side of the inclination is generated. To travel straight ahead against the vehicle body pull, the driver rotates the steering wheel H slightly to the right, and holds the steering in this state. Hence, a load is given to the driver.

Also, as shown in FIG. 6B, since the inclination of a cant road may vary depending on the lane, the driver drives the vehicle in accordance with each inclination.

[Cant Road (with One-Side Pull Response Control)]

As shown in FIG. 5C, in the case of the same cant road, if the one-side pull response control is provided, the midpoint shift controller 120 of the steering hold assist controller 12 shown in FIG. 3 shifts the midpoint of the steering angle. As shown in FIG. 3, the EPS_ECU 1 adds the output current value (target current value (one-side pull response)) based on the shifted midpoint output from the steering hold assist controller 12 to the target current value output from the EPS controller 11 (the adder 16), and generates actual current to be supplied to the motor 3 (motor driver 17).

Although the detail is described later, with the one-side pull response control, even in the situation in which the one-side pull (vehicle body pull) is generated, the load of the driver for holding the steering of the steering wheel H is markedly decreased, and the steering load at the level of a flat road can be achieved.

[Operation 2]

Next, with reference to FIGS. 5A to 5C, a period from when the vehicle C of this embodiment enters the cant road from the flat road to when the one-side pull response control is started, is described in time series (with reference to FIGS. 2 and 3 if required).

[Flat Road]

On the flat road shown in FIG. 5A, it is assumed that the driver turns ON the cruise control switch SW arranged at the steering wheel H. Then, under the control of the FI_ECU 2, the DBW valve 5 is controlled, to provide travel at a constant speed. Accordingly, the driver saves an effort of operating an accelerator pedal for the travel at the constant speed. Further, since the cruise control switch SW is turned ON, in the FI_ECU 2, the cruise controller 21 outputs a signal indicative of that the cruise control switch SW is turned ON, to the switch 14. The switch 14 is switched in response to the signal serving as a trigger, and causes the target current value output from the steering hold assist controller 12 to pass to the downstream limiter 15. Also, the switch 14 shuts off the zero current value output from the zero current value output unit 13.

Since the cruise control switch SW is turned ON, the target current value (one-side pull response) output from the steering hold assist controller 12 is apparently added to the target current value output from the EPS controller 11 at the adder 16.

However, as shown in FIG. 5A, the value of the steering torque is left-right symmetric (equivalent) about zero. Owing to this, (see FIG. 4,) the additional torque integrated at the integrator 1205 does not become a value exceeding a threshold (midpoint shift judgment threshold) set in the steering angle midpoint shift amount setting unit 1206.

That is, in the slight steering on the flat road, the initial value of 0 deg is output as the one-side pull response steering angle value from the steering angle midpoint shift amount setting unit 1206. Hence (see FIG. 3), the steering hold assist current value setting unit 122 executes control by using the one-side pull response steering angle value, which does not cause the midpoint to be shifted. Further, in the case of the straight-ahead travel on the flat road as described above, any of the steering torque, the steering angle, and the motor rotation speed (steering speed) is small. Hence, the target current value (one-side pull response) output from the steering hold assist controller 12 is zero or a value close to zero.

Even if the target current value (one-side pull response) output from the steering hold assist controller 12 is added to the target current value output from the EPS controller 11 because the driver turns ON the cruise control switch SW, the target current value (one-side pull response) is zero or a value close to zero on the flat road as described above.

As it is understood with reference to FIGS. 3 to 5C, in the vehicle C of this embodiment, the respective functions of the steering hold assist controller 12 are constantly activated and the target current value (one-side pull response) is output. Regarding this point, the respective functions of the steering hold assist controller 12 in rest may be operated in response to that the cruise control switch SW is turned ON as a trigger.

[Cant Road (Before One-Side Pull Response Control)]

Next, it is assumed that the vehicle C enters the cant road shown in FIG. 5B from the flat road. It is assumed that the cruise control switch SW is already turned ON on the flat road.

The driver rotates the steering wheel H slightly to the right to correspond to the one-side pull and holds the steering. The force which tends to cause the vehicle C on the cant road to pull to the left (vehicle body pull) is balanced with the force which is generated at the vehicle body of the vehicle C because the steering wheel H is rotated to the right. As the result of the balance, the vehicle C holds straight-ahead travel. Of course, if the state is continued for a long period, a load is given to the driver as described above.

Then, the additional value, in which the steering torque passing through the low-pass filter 1201 is added to the value obtained by converting the output current of the motor 3 into the torque at the torque converter 1202, is increased. The additional torque integrated by the integrator 1205 is continuously increased.

The midpoint shift cancel judging unit 1204 monitors establishment of the cancel condition that (1) the yaw rate exceeds the predetermined threshold or (2) the steering angle speed (motor rotation speed) exceeds the predetermined threshold. If any of the values exceeds the corresponding threshold, the midpoint shift cancel judging unit 1204 judges that the straight-ahead travel is collapsed (cancel condition is met), outputs the cancel signal to the integrator 1205, and thus sets the torque integral value at zero. Such a cancel condition is met, for example, when the vehicle changes the lane or the vehicle turns right at an intersection.

The steering angle midpoint shift amount setting unit 1206 monitors whether the torque integral value output from the integrator 1205 exceeds the midpoint shift judgment threshold or not. If the torque integral value exceeds the midpoint shift judgment threshold, the one-side pull response steering angle value is shifted (increased or decreased), and is output to the subtracter 121 (see FIG. 3) as an output of the midpoint shift controller 120.

The target current value (one-side pull response) output from the steering hold assist controller 12 is not large enough to assist the holding of the steering even if the cruise control switch SW is turned ON unless the torque integral value exceeds the midpoint shift judgment threshold. The force of the driver for holding the steering is not decreased. If the midpoint shift judgment threshold is a small value, the time required until the one-side pull response control is started is decreased.

[Cant Road (when One-Side Pull Response Control is Started)]

In FIG. 5C, the torque integral value exceeds the steering angle midpoint shift judgment threshold. Accordingly, the one-side pull response steering angle value is, for example, increased and output from the midpoint shift controller 120. As the result, the steering hold assist current value setting unit 122 sets the current value based on the shifted midpoint. The current value, which is set by (output from) the steering hold assist current value setting unit 122 is a current value (base current value) serving as the base for the target current value (one-side pull response). As described above, the map of the steering angle and the current value (base current value) in the steering hold assist current value setting unit 122 (that is, information of correspondence between the steering angle and the current value) is configured to provide the center feel of the steering angle by raising or lowering the current across the border of the steering angle of 0 degree.

Also, in this embodiment, the multiplier 125 multiplies the base current value, which is output from the steering hold assist current value setting unit 122 and processed by the low-pass filter 123, by the first ratio output from the first ratio output unit 124. The first ratio is set to be smaller as the steering torque is larger. This is because the target current value (one-side pull response) is decreased so that the target current value (one-side pull response) output from the steering hold assist controller 12 does not disturb travel when the vehicle turns right or left, changes the lane, or makes an obstacle avoidance behavior.

Also, the adder 129 adds the damper current value output form the damper current value setting unit 126 to the base current value multiplied by the first ratio. The damper current value is set so that the absolute value of the damper current value becomes the minimum when the motor rotation speed is zero. Then the multiplier 128 multiplies the damper current value by the second ratio output from the second ratio output unit. The multiplied damper current value is set at a large value for quick steering and is set at a small value for strong steering (right or left turn, lane change, obstacle avoidance behavior, etc.). Then, the adder 129 adds the damper current value to the base current value.

As described above, the steering hold assist controller 12 executes control to supply the motor 3 with current, which prevents the motor 3 from being rotated by an external force caused by a cant road or side winds (further, steering with an unintentional small force of the driver), in other words, current which prevents the position of the steering wheel H held by the driver from being shifted by the external force.

The base current value, which is multiplied by the first ratio by the multiplier 125 and which is added with the damper current value by the adder 129, is output from the steering hold assist controller 12 as the target current value (one-side pull response). The output target current value (one-side pull response) is selected by the switch 14, passes through the limiter 15, and is added at the adder 16, because the cruise control switch SW is ON.

With the one-side pull response control, in the vehicle C, according to this embodiment, even on a canted road or in side winds, a displacement from the angle (steering angle) of the steering wheel H determined by the driver is restricted by the force of the motor 3, and the load of the driver for holding the steering is markedly decreased to the level of a flat road.

In the example in FIG. 5C, the driver feels that the center of the steering wheel H (the steering angle with the steering torque being zero) is slightly shifted to the right with respect to the center.

The one-side pull response control is ended if the driver operates the cruise control switch SW, or if the cruise control switch SW is turned OFF by an operation of the accelerator pedal by the driver. When the driver operates the steering wheel H to change the lane etc., the torque integral value, in which the additional torque is integrated at the integrator 1205 in response to an instruction of the midpoint shift cancel judging unit 1204 is cleared to zero, and the midpoint is no longer shifted at the steering hold assist current value setting unit 122. If the cant road is continued even after the steering, and the driver continuously hold the steering corresponding to that cant road, the one-side pull response control is started again, and the midpoint is shifted.

[Flowchart for Cruise Control Association]

FIG. 7A is a brief flowchart showing association between the cruise control and the one-side pull response control according to this embodiment. FIG. 7B schematically shows time charts of the one-side pull response control. In FIG. 7B, part (a) shows a temporal transition of a cruise control switch position, part (b) shows a temporal transition of an actual steering angle, part (c) shows a temporal transition of a one-side pull response steering angle when a steering angle of θ at a time t2 serves as an initial value, and part (d) schematically shows a temporal transition of the one-side pull response steering angle when a steering angle of zero at the time t2 serves as an initial value.

In the flowchart in FIG. 7A, it is judged whether or not the EPS_ECU 1 is in the control for the cruise control, that is, whether or not the cruise controller 21 outputs a CC execution flag (step S1). If the driver turns ON the cruise control switch SW, the state is under the control of the cruise control (YES in step S1), the EPS_ECU 1 turns ON steering hold assist control (one-side pull response control) (step S2). That is, the switch 14 of the EPS_ECU 1 is switched to select the target current value (one-side pull response) output from the steering hold assist controller 12. Accordingly, the one-side pull response control (steering hold assist control) is enabled.

In contrast, if the driver turns OFF the cruise control switch SW or the cruise control switch SW is turned OFF because a brake etc. is operated (NO in step S1), the cruise controller 21 does not output the CC execution flag. The switch 14 is switched to select the zero current value output from the zero current value output unit 13. Accordingly, the one-side pull response control (steering hold assist control) is disabled (step S3).

In this embodiment, even if the CC execution flag is not output, as shown in FIGS. 2 to 4, the respective units such as the integrator 1205 function. Hence, in step S3, indications such as "system ON" and "system inactive" of the one-side pull response control may be displayed on an instrument panel etc. Also, in step S2, indications such as "system ON" and "system active" of the one-side pull response control may be displayed on the instrument panel etc.

Referring to the illustration of the temporal transition of the cruise control switch position in part (a) of FIG. 7B, the cruise control switch is OFF at a time t1 whereas the driver turns ON the cruise control switch at a time t2. Hence, at the time t2, the CC execution flag is output (YES in step S1).

Referring to the illustration of the temporal transition of the actual steering angle in part (b) of FIG. 7B, as indicated by a broken line, the actual steering angle by the operation of the driver with the steering wheel H is zero until the time t1. The actual steering angle increases at the time t1 and later. This is because the driver operates the steering wheel H in response to that the vehicle body starts one-side pull when the vehicle C enters a cant road.

Next, referring to the illustration of the temporal transition of the one-side pull response steering angle shown in part (c) of FIG. 7B, in response to that the cruise control switch SW is turned ON at the time t2, the one-side pull response steering angle is output from the midpoint shift controller 120. In this example, the initial value is the steering angle of θ at the time t2. In this example, the one-side pull response steering angle value increases stepwise in accordance with a gradual increase of the actual steering angle. Accordingly, the effort required for holding the steering wheel H by the driver on the cant road is decreased. In this example, it is established that torque integral value > threshold at the time t2.

In contrast, referring to the illustration of the temporal transition of the one-side pull response steering angle in part (d) of FIG. 7B, this illustration differs from part (c), and the initial value of the one-side pull response steering angle value is 0 deg. Owing to this, at the time t2, the one-side pull response steering angle output from the midpoint shift controller 120 is started from 0 deg. Then, by gradually rotating the steering wheel H little by little, the one-side pull response steering angle increases stepwise similarly to the illustration in part (c).

Assuming that the one-side pull response control is started during a turn, if the actual steering angle serves as the initial value, an excessive one-side pull response steering angle value is set, and this value may give the driver uncomfortable feel. However, as long as the initial value is 0 deg, such uncomfortable feel is not generated.

As described above, at the time t2, if the driver turns ON the cruise control switch SW, (see part (a) in FIG. 7B), the CC execution flag is output, and the switch 14 outputs the target current value (one-side pull response) from the steering hold assist controller 12 to the adder 16 through the limiter 15. Accordingly, the one-side pull response control is enabled and the steering torque is decreased. The driver feels like that the center of the steering wheel H is shifted.

[One-side Pull Response Control During Turn 1]

For example, a case in which the cruise control switch SW is turned ON during a turn is considered. Since the state is during the turn, the steering torque may be large and the torque additional value may be large.

Also, it is assumed that, at the time t2, the driver turns ON the cruise control switch SW. Then, the motor driver 17 drives the motor 3 with the target current value taking into account the target current value (one-side pull response).

In this state, that is, in the state in which the midpoint is shifted, at initial state when the vehicle C is returned from the turn to straight-ahead travel, the motor 3 is controlled so that the rotation of the motor 3 is restricted at the shifted midpoint. Hence, at initial state when the state is shifted to the straight-ahead travel, the steering wheel H may not be smoothly returned (the effect of a self-alignment torque is decreased).

However, in this embodiment, as shown in FIG. 4, the midpoint shift cancel judging unit 1204 monitors (1) whether or not the yaw rate exceeds the predetermined threshold or (2) whether or not the motor rotation speed (steering angle speed) exceeds the predetermined threshold, and if any of the values exceeds the corresponding threshold, it is assumed that the cancel condition is met. Then, the midpoint shift cancel judging unit 1204 outputs the cancel signal to the integrator 1205. Accordingly, the torque integral value is cleared to zero, and the midpoint of the steering angle is not shifted. Hence, even if the cruise control switch SW is turned ON and the target current value (one-side pull response) of the steering hold assist controller 12 is added to the target current value of the EPS controller 11, the return of the steering wheel H by the self-alignment torque is not significantly disturbed.

[One-Side Pull Response Control During Turn 2]

As described above, at start of the straight line, even if the yaw rate becomes smaller than the predetermined threshold, the midpoint shift cancel judging unit 1204 continuously outputs the cancel signal for several seconds. This is because, since the steering torque may be disordered after recover from the turn, the torque additional value at this time is prevented from being reflected on the torque integral value of the integrator 1205.

To be more specific, it is assumed that a curve portion is present in the middle of the cant road. The driver operates the steering wheel H along the curve. The cruise control switch SW is not turned OFF even at the curve (during turn). However, the midpoint shift cancel judging unit 1204 judges whether or not the yaw rate or the motor rotation speed exceeds the corresponding threshold (judgment of straight-ahead travel), and if the value exceeds the corresponding threshold, the torque integral value is cleared to zero. Hence, the midpoint is not shifted, and disturbance such as uncomfortable feel is not generated during the steering.

When the curve is ended, in the midpoint shift cancel judging unit 1204, the yaw rate or the motor rotation speed becomes smaller than the corresponding threshold. Then, the midpoint shift cancel judging unit 1204 no longer outputs the cancel signal, and the integrator 1205 starts integration.

However, in the case of a driver who is unskilled in driving, in the case of driving at night, or under other certain circumstance, the steering wheel H may be excessively rotated for a turn. Owing to this, when the turn is ended, the vehicle may be steered by a certain degree in a direction opposite to the turn direction. At this time, the steering to the opposite direction is considered as the result of the effect by the cant road surface, and control may not be properly made for the one-side pull.

Description is given with reference to FIG. 8. FIG. 8 shows changes in steering torque (thin solid line), yaw rate (thick broken line), and cancel signal (thick two-dot chain line) when the travel state is shifted from a turn (left side in the drawing) to straight-ahead travel (right side in the drawing). The output of the cancel signal is stopped (turned OFF) when the thick two-dot chain line rises.

In the example in FIG. 8, around the end of the turn (in the transient region), a torque in the opposite direction is detected, and hence the torque is disordered. This is because the driver returns the steering wheel H which is excessively rotated. In contrast, the yaw rate exhibits the straight-ahead travel even in the transient region. Although not shown, the motor rotation speed (steering angle speed) is substantially zero (within the threshold).

In the example in FIG. 8, in the midpoint shift cancel judging unit 1204, even if yaw rate ≤ threshold and motor rotation speed ≤ threshold are established (that is, the judgment is changed to the straight-ahead travel) because the turn is ended, the midpoint shift cancel judging unit 1204 continuously outputs the cancel signal (ON) for several seconds even after the judgment of the straight-ahead travel is made. Accordingly, regardless of whether the CC execution flag is ON and the one-side pull response control is enabled or the CC execution flag is OFF and the one-side pull response control is disabled, the one-side pull response control is inhibited (the torque integral value is continuously cleared to zero). Being cleared to zero corresponds to that "the correction current value is not newly calculated."

The several seconds are a predetermined time, and may be a time that is appropriately set with regard to the length of the time of the transient region through an experiment or a simulation. Alternatively, the several seconds may be set as a time that is dynamically variable in accordance with the disorder of the steering torque.

Regardless of being fixed or dynamic, if the set several seconds elapse, the cancel signal is no longer output (becomes OFF), the integrator 1205 integrates the torque additional value and hence calculates the torque integral value. Then, if the steering angle midpoint shift amount setting unit 1206 judges that the calculated value exceeds the midpoint shift judgment threshold, the midpoint is shifted.

Conclusion of First Embodiment

With the above-described first embodiment, proper steering hold assist is provided in association with the cruise control even when an external force that causes one-side pull to be generated at the vehicle C is generated, for example, by a cant road or side winds, the assist which has not been properly provided by EPS of related art. Hence, the load of the driver can be markedly decreased.

Also, at start of straight travel recovered from a turn, even if the vehicle behavior is judged as straight-ahead travel, the cancel signal is continuously output for several seconds similarly to a turn. Accordingly, in the transient region, if the torque integral value may possibly exceed the midpoint shift judgment threshold, the torque integral value is actually cleared to zero. Consequently, the one-side pull response control is inhibited (that is, the target current value (the one-side pull response), which is the correction current value, is not calculated), and the proper one-side pull response control can be executed.

In this embodiment, the one-side pull response control (steering hold assist control) is associated with the cruise control switch SW, and if the cruise control switch SW is turned ON, the switch 14 is switched to the steering hold assist controller 12 and the one-side pull response control is enabled. Alternatively, a switch that enables the one-side pull response control may be provided, and if this switch is turned ON, the switch 14 may be switched to the steering hold assist controller 12.

However, a situation in which the one-side pull response control is used is similar to a situation in which the cruise control is used. Hence, in the first embodiment, a switch for enabling the one-side pull response control is not independently provided, and is shared by the cruise control switch SW. Accordingly, the number of parts is decreased, and the operation of the driver is simplified.

Second Embodiment

Next, a second embodiment of the present disclosure is described.

Figure 9:
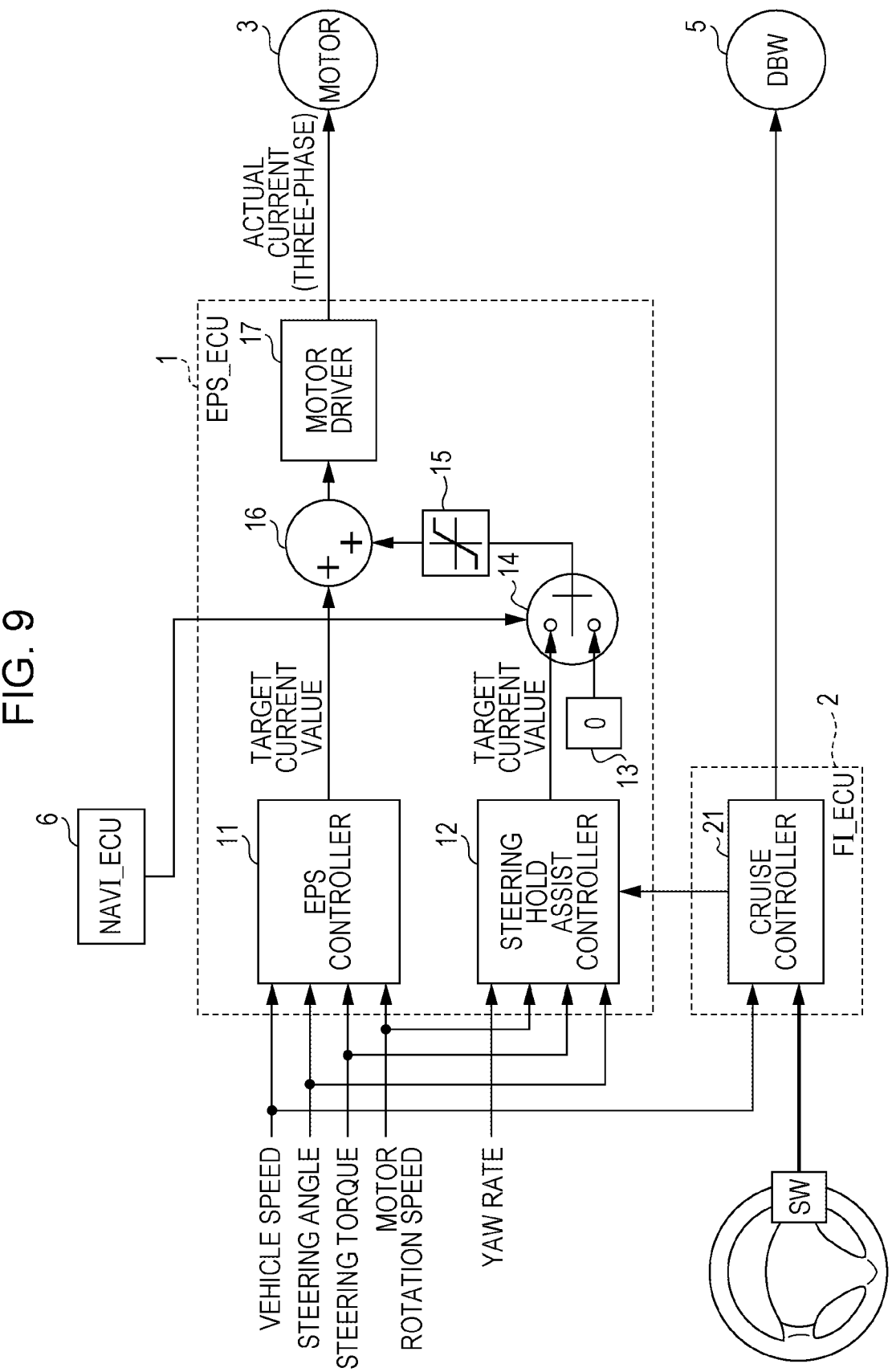
FIG. 9 is a block diagram showing association according to a second embodiment.

FIG. 9 is an illustration showing association according to the second embodiment.

Regarding the association between the cruise controller 21 in the FI_ECU 2 and the EPS_ECU 1 according to the above-described first embodiment (see FIG. 2 etc.), based on an assumption that, when the cruise control switch SW is ON, the one-side pull response control (steering hold assist control) is more likely executed, and when the cruise control switch SW is ON, large steering is less made and the one-side pull response control less likely disturbs comfortableness of the driver; the switch 14 is switched to the steering hold assist controller 12 and the one-side pull response control is enabled in response to the ON state of the cruise control switch SW as a trigger.

In the second embodiment, such association like the first embodiment is not provided; however, association with an ECU of a navigation system (NAVI_ECU 6) is provided. With this association, if the NAVI_ECU 6 judges that the vehicle C is on a straight road, the NAVI_ECU 6 outputs a signal (flag) indicative of the judgment, to switch the switch 14 to the steering hold assist controller 12 and to enable the one-side pull response control; and if the NAVI_ECU 6 judges that the vehicle C is not on a straight road, outputs a signal (flag) indicative of the judgment, to switch the switch 14 to the zero current value output unit 13 (disable the one-side pull response control). The reason is similar to the association with the cruise controller 21 in the first embodiment, and hence the description is omitted.

Also, since the navigation system is a known technology, the description of the NAVI_ECU 6 is also omitted.

Even in the second embodiment, regardless of whether the one-side pull response control is enabled or disabled, the steering hold assist controller 12 provides the function. Similarly to the first embodiment, in the midpoint shift cancel judging unit 1204, even if yaw rate ≤ threshold and motor rotation speed ≤ threshold are established (that is, even if straight-ahead travel is judged), the midpoint shift cancel judging unit 1204 continuously outputs the cancel signal (ON) for several seconds even after the judgment of the straight-ahead travel is made. Accordingly, the one-side pull response control is inhibited.

In the second embodiment, the cruise controller 21 in the FI_ECU 2 is associated with the EPS_ECU 1 in a meaning different from the first embodiment. Hereinafter, different association with the cruise controller 21 in the second embodiment is described.

A situation, in which the cruise control switch SW is turned ON by the driver, may be equivalent to a situation, in which the driver's intention for steering is weak. Hence, the force of gripping the steering wheel H may be possibly weakened. In the second embodiment, in association with the cruise controller 21, if the steering hold assist controller 12 detects that the cruise controller 21 outputs the CC execution flag (described in the first embodiment), the steering hold assist controller 12 increases the control amount of the one-side pull response control (target current value (one-side pull response)) (the method of increasing the control amount may be reversal to a method of a third embodiment, described later).

Accordingly, even if the cruise control switch SW is turned ON by the driver during the one-side pull response control, and even if the driver weakens the force of gripping the steering wheel H, the steering can be held properly.

The switch with reference sign of SW in FIG. 9 is described as the cruise control switch. However, the switch with reference sign of SW may not be the cruise control switch, and may be replaced with a hand-release detection sensor that detects whether or not the driver grips the steering wheel H or not (hand is released or not). The steering hold assist controller 12 may use the signal of the hand-release detection sensor SW, and if the hand is released, the control amount of the one-side pull response control may be increased (that is, the reference sign SW in this case denotes the hand-release detection sensor).

In the above description, the reference sign SW denotes the cruise control switch or the hand-release detection sensor. However, these members may not be alternatively provided, and both may be provided.

Also with the second embodiment, like the above-described first embodiment, proper one-side pull response control can be executed particularly in the shift from a curve to a straight line. Also, in the second embodiment, proper one-side pull response control can be executed when the steering hold force of the driver is weakened.

Third Embodiment

In the above-described second embodiment, the control amount of the one-side pull response control is increased when the steering hold force of the driver is weakened. In contrast, in a third embodiment, the control amount of the one-side pull response control (target current value (one-side pull response)) is decreased or the one-side pull response control is stopped.

Figure 10:
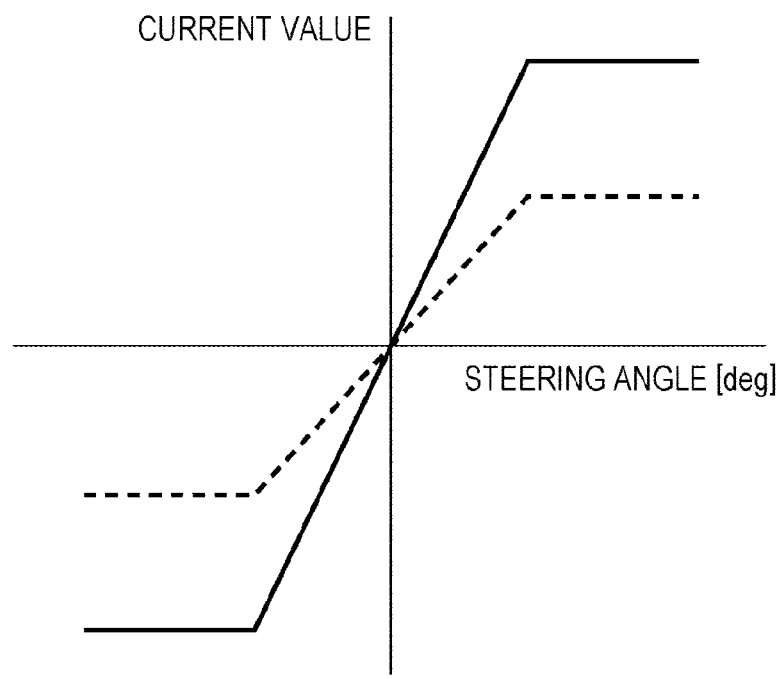
FIG. 10 illustrates an example in which a control amount of one-side pull response control is decreased by adjusting information of correspondence between a steering angle and a current value in a steering hold assist current value setting unit in FIG. 3, as an example of a third embodiment.

FIG. 10 illustrates an example in which the control amount of the one-side pull response control is decreased by adjusting information of correspondence between the steering angle and the current value in the steering hold assist current value setting unit 122 in FIG. 3, according to an example of the third embodiment.

[At Very Low Vehicle Speed Etc.]

Steering at a very low vehicle speed or when a vehicle stops (idly stops) receives a large road-surface resistance, and hence requires a large steering force. Hence, when the vehicle speed based on the wheel speed sensor 44 is as low as, for example, 10 km/h or lower, or when the vehicle stops at zero vehicle speed, the control amount of the one-side pull response control (target current value (one-side pull response)) is decreased or the one-side pull response control is stopped.

A decreasing method may be that (1) the current value (absolute value) corresponding to the steering angle in information (map) of correspondence between the steering angle and the current value (base current value) in the steering hold assist current value setting unit 122 (see FIG. 3) is decreased from a solid line to a broken line as shown in FIG. 10. Also, another decreasing method may be that (2) while the steering angle midpoint shift amount setting unit 1206 (see FIG. 4) shifts the steering angle by 0.2 deg (absolute value), that is, shifts the one-side pull response steering angle value from 0 deg to 0.2 deg, the shift may be changed to 0.1 deg (the angle herein is merely an example). Also, yet another decreasing method may be that (3) the midpoint shift judgment threshold in the steering angle midpoint shift amount setting unit 1206 (see FIG. 4) is increased. In this way, the control amount of the one-side pull response control can be decreased by any of various methods.

Also, the one-side pull response control can be stopped, for example, by switching the switch 14 to the zero current value output unit 13.

[At Night]

Also, at night, since visibility is poor (recognizable forward distance is decreased), the straight-ahead travel judgment by visual check of the driver may become not reliable. Owing to this, although the driver can align the steering wheel H with the steering angle corresponding to the cant road in daylight, the accuracy of alignment is decreased at night. Consequently, the steering is more frequently corrected at night.

If the steering is more frequently corrected, the midpoint of the steering angle is more frequently shifted by the one-side pull response control. This frequent shift may give the driver some uncomfortable feel. Hence, at night, the one-side pull response control amount is decreased or the one-side pull response control is stopped by any of the above-described methods. Accordingly, the uncomfortable feel can be restricted.

The control amount can be decreased or the control is stopped by setting the one-side pull response steering angle value of the steering angle midpoint shift amount setting unit 1206 at a value smaller than 0.2 deg, through association with a switch of a headlight or association with a clock included in the vehicle (the angle herein is also merely an example).

Blinker Operation

Also, when a blinker is operated, the control amount of the one-side pull response control is decreased or the shift of the one-side pull response steering angle value is stopped in association with the blinker.

Also, when anti brake lock system (ABS) or vehicle stability assist (VSA, registered trademark) is activated, or when an obstacle avoidance assist device (rear-end collision avoidance device) is activated, the control amount of the one-side pull response control is decreased or the shift of the one-side pull response steering angle value is stopped in association with any of ABS and VSA. In this case, in the obstacle avoidance device or the like, the control amount of the one-side pull response control may be variable in accordance with a time to collision (TTC). For example, the control amount (target current value (one-side pull response)) is set at a smaller value if TTC is 2 seconds, as compared with the control amount if TTC is 5 seconds.

[Transition from Curve to Straight Line]

In the above-described first embodiment, in the midpoint shift cancel judging unit 1204, if yaw rate ≤ threshold and motor rotation speed ≤ threshold are established (that is, judgment is switched to straight-ahead travel judgment), the midpoint shift cancel judging unit 1204 continuously outputs the cancel signal, and the one-side pull response control is inhibited for several seconds (for a while).

However, the one-side pull response control may not be inhibited, and the control amount of the one-side pull response control can be decreased by a method similar to the method at the very low vehicle speed, at night, or with the blinker operation. That is, in the third embodiment, the cancel signal is not output even in the transient region after a turn (see FIG. 8) and the torque integral value is calculated (integrator 1205). Even if the midpoint is shifted, the control amount is decreased.

[Others]

The present disclosure described in the first to third embodiments may be implemented without being limited to the above-described embodiments. For example, the midpoint shift cancel judging unit 1204 corresponding to the straight-ahead travel judgment in the first embodiment may output the cancel signal if a navigation system recognizes that the vehicle C travels on a curve road or a town street.

Also, the shift amount of the midpoint may be increased in accordance with the magnitude of the torque integral value or the magnitude of the shift average value of the torque additional values. In this case, when the vehicle behavior is disordered (if the yaw rate or the steering angle is changed), the torque integral value may be cleared to zero or the shift average value may be cleared to zero.

Also, the switch 14 or the zero current value output unit 13 is not an essential configuration, and may be omitted.

Also, in any of the above-described embodiments, the one-side pull response control is restricted or inhibited in the steering hold assist controller 12. For an example of inhibition, the one-side pull response control may be inhibited by switching the switch 14 to the zero current value output unit 13 such as when the cruise control switch SW is OFF.

Also, for an example of decrease, of course, a configuration that restricts the target current value may be provided between the steering hold assist controller 12 and the adder 16.

Also, the configuration of restricting or inhibiting the one-side pull response control, and the configuration that does not calculate the target current value (one-side pull response) as the correction current value are not limited to specific units or methods.

Also, the present disclosure may be applied not only to the vehicle C including the engine, but also to any kind of vehicles, such as an electric vehicle or a fuel-cell electric vehicle. In the case of the electric vehicle or fuel-cell electric vehicle, the cruise control controls drive of an inverter for a drive motor, to provide travel at a constant vehicle speed. Also, the cruise control may be applied to adoptive cruise control (ACC) that keeps a predetermined distance between vehicles by automatically operating a brake in addition to an accelerator.

Further, the present disclosure may be applied to a situation in which a body of a vessel (ship, boat) pulls in the lateral direction because of tide or side winds (in a situation that one-side pull is generated), when a driver holds steering of a steering handle of the vessel. That is, the present disclosure may be applied by replacing the wording vehicle in the claims with a vessel or other configuration of transportation. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle steering device comprising:
   a steering torque detection unit that detects a steering torque, the vehicle steering device controlling an electric current value applied to an electric motor to apply an assist torque to a steering system based on the steering torque;
   a one-side pull response controller that detects one-side pull of a vehicle, and determines if a vehicle is traveling straight in accordance with a vehicle behavior and a steering angle, calculates an integral value of the steering torque by integrating the steering torque while it is determined that the vehicle is traveling straight, and calculates a correction current value, which corrects the electric current value to restrict the one-side pull of the vehicle based on the integral value and the steering angle; and
   a switch device configured to enable the one-side pull response control by the one-side pull response controller, the switch device serving as a cruise control switch device which enables cruise control by a cruise control controller equipped in a vehicle, the switch device being operated by a vehicle operator,
   wherein the one-side pull response controller, on condition that the switch device is in ON state, restricts or prohibits the one-side pull response control for a predetermined amount of time after the vehicle ends a turn and the vehicle is determined as traveling straight even if the one-side pull is still being detected.

2. The vehicle steering device according to claim 1, wherein the steering torque detection unit is a steering torque detection sensor.

3. The vehicle steering device according to claim 1, wherein the one-side pull response controller restricts or prohibits the one-side pull response control for the predetermined amount of time after the vehicle ends the turn and the vehicle is started traveling straight even if the one-side pull is still being detected.

4. A vehicle steering device comprising:
   a steering torque detection unit that detects a steering torque, the vehicle steering device controlling an electric current value applied to an electric motor to apply an assist torque to a steering system based on the steering torque;
   a steering angle detection unit that detects a steering angle;
   a vehicle behavior detection unit that detects a vehicle behavior; and
   a one-side pull response controller that detects one-side pull of a vehicle, and determine if a vehicle is traveling straight in accordance with the vehicle behavior and the steering angle, calculates an integral value of the steering torque by integrating the steering torque while it is determined that the vehicle is traveling straight, and calculates a correction current value, which corrects the electric current value to restrict the one-side pull of the vehicle based on the integral value and the steering angle; and
   a switch device configured to enable one-side pull response control by the one-side pull response controller, the switch device serving as a cruise control switch device which enables cruise control by a cruise control controller equipped in a vehicle, the switch device being operated by a vehicle operator,
   wherein, on condition that the switch device is in ON state, the one-side pull response controller does not newly calculate the correction current value for a predetermined amount of time after a turn of the vehicle is ended and the vehicle is determined as traveling straight even if the one-side pull is still being detected.

5. The vehicle steering device according to claim 4, wherein the steering torque detection unit is a steering torque detection sensor, the steering angle detection unit is a steering angle detection sensor, and the vehicle behavior detection unit is a yaw rate sensor.

6. The vehicle steering device according to claim 4, wherein the correction current value is not updated for the predetermined amount of time after the turn of the vehicle is ended and the vehicle is determined as traveling straight.

7. The vehicle steering device according to claim 4, wherein the one-side pull response controller determines whether the integral value of the steering torque exceeds a predetermined threshold, and if so, shifts a steering angle midpoint, and
   wherein the one-side pull response controller prohibits shifting of the steering angle midpoint for the predetermined amount of time after the turn of the vehicle is ended and the vehicle is determined as traveling straight.

8. The vehicle steering device according to claim 7, wherein the correction current value is converted into a torque value and added to the integral value of the steering torque.

9. The vehicle steering device according to claim 4, wherein the correction current value is set to restrict a motion of the motor with respect to a force generating one-side pull.

10. A vehicle steering device comprising:
- a steering torque detection unit that detects a steering torque, the vehicle steering device controlling an electric current value applied to an electric motor to apply an assist torque to a steering system based on the steering torque;
- a steering angle detection unit that detects a steering angle;
- a vehicle behavior detection unit that detects a vehicle behavior; and
- a one-side pull response controller that detects one-side pull of a vehicle, and determines if a vehicle is traveling straight in accordance with the vehicle behavior and the steering angle, calculates an integral value of the steering torque by integrating the steering torque while it is determined that the vehicle is traveling straight, and calculates a correction current value, which corrects the electric current value to restrict the one-side pull of the vehicle based on the integral value and the steering angle; and
- a switch device configured to enable one-side pull response control by the one-side pull response controller, the switch device serving as a cruise control switch device which enables cruise control by a cruise control controller equipped in a vehicle, the switch device being operated by a vehicle operator,
wherein, on condition that the switch device is in ON state, the one-side pull response controller decreases a control amount of a control by the one-side pull response controller for a predetermined amount of time after a turn of the vehicle is ended and the vehicle is determined as traveling straight even if the one-side pull is still being detected.

11. The vehicle steering device according to claim 10, wherein the steering torque detection unit is a steering torque detection sensor, the steering angle detection unit is a steering angle detection sensor, and the vehicle behavior detection unit is a yaw rate sensor.

12. The vehicle steering device according to claim 10, wherein the one-side pull response controller decreases the control amount of the one-side pull response control or stops the one-side pull response control when traveling at night.

13. The vehicle steering device according to claim 12, wherein the one-side pull response controller determines whether traveling at night by using on-state and off-state of a headlight.

14. A method of controlling vehicle steering device of a vehicle including a steering torque sensor that detects a steering torque, the vehicle steering device controlling an electric current value applied to an electric motor to apply an assist torque to a steering system based on the steering torque, the vehicle including a switch device configured to enable one-side pull response control, the switch device serving as a cruise control switch device which enables cruise control of the vehicle, the switch device being operated by a vehicle operator, the method comprising:
- detecting, by using an electronic control unit, one-side pull of a vehicle, and by using the electronic control unit, determining if a vehicle is traveling straight in accordance with a vehicle behavior and a steering angle, calculating an integral value of the steering torque by integrating the steering torque while it is determined that the vehicle is traveling straight, and calculating a correction current value, which corrects the electric current value to restrict the one-side pull of the vehicle based on the integral value and the steering angle; and
- on condition that the switch device is in ON state, restricting or prohibiting, by using the electronic control unit, correcting the electric current value for a predetermined amount of time after the vehicle ends a turn and the vehicle is determined as traveling straight even if the one-side pull is still being detected.

15. The method of controlling vehicle steering device according to claim 14, wherein the step of restricting or prohibiting restricts or prohibits correcting the electric current value for a predetermined amount of time after the vehicle ends a turn and the vehicle is started traveling straight even if the one-side pull is still being detected.

* * * * *